United States Patent
Hill, III et al.

(10) Patent No.: US 10,876,394 B2
(45) Date of Patent: Dec. 29, 2020

(54) MEASUREMENT DEVICE HAVING A PLURALITY OF SENSORS DISPOSED IN MOVABLE ARMS

(71) Applicant: HALLIBURTON ENERGY SERVICES, INC., Houston, TX (US)

(72) Inventors: Freeman Lee Hill, III, Spring, TX (US); Sushovon Singha Roy, Houston, TX (US); Francis Michael Heaney, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/563,011

(22) Filed: Sep. 6, 2019

(65) Prior Publication Data

US 2020/0109974 A1   Apr. 9, 2020

Related U.S. Application Data

(60) Provisional application No. 62/741,464, filed on Oct. 4, 2018.

(51) Int. Cl.
   *G01F 1/20*   (2006.01)
   *E21B 47/10*   (2012.01)
   *G01N 11/08*   (2006.01)

(52) U.S. Cl.
   CPC .............. *E21B 47/10* (2013.01); *G01N 11/08* (2013.01)

(58) Field of Classification Search
   None
   See application file for complete search history.

(56) References Cited

U.S. PATENT DOCUMENTS

| | | | | |
|---|---|---|---|---|
| 5,251,479 | A | * | 10/1993 | Siegfried, II ....... E21B 17/1021 73/152.29 |
| 5,631,413 | A | * | 5/1997 | Young ................. E21B 17/1021 73/152.21 |
| 7,884,951 | B2 | * | 2/2011 | Prouvost ................ G01B 11/12 356/625 |
| 2008/0210422 | A1 | * | 9/2008 | Clark ...................... E21B 47/12 166/254.2 |
| 2012/0055711 | A1 | * | 3/2012 | Brannigan ............. E21B 47/08 175/50 |
| 2012/0084021 | A1 | * | 4/2012 | Jones ...................... E21B 47/10 702/45 |

(Continued)

*Primary Examiner* — Harshad R Patel
(74) *Attorney, Agent, or Firm* — Polsinelli PC (57) ABSTRACT

A method for measuring fluid flow including disposing a measurement device within a fluidic channel, the measurement device including a hydrodynamic central body, a plurality of arms coupled with and operable to extend from and retract to the hydrodynamic central body, and a plurality of sensors disposed within the hydrodynamic central body and distributed along the length of each of the plurality of arms; triggering, via an actuator, the plurality of arms to expand from the hydrodynamic central body until a portion of each of the plurality of arms abut a sidewall of the fluidic channel; collecting, via the plurality of sensors, measurements relating to one or more fluid flow parameters within the fluidic channel; triggering, via the actuator, the plurality of arms to contract inwards to the hydrodynamic central body; and retracting the measurement device from the fluidic channel.

17 Claims, 6 Drawing Sheets

(56) References Cited

U.S. PATENT DOCUMENTS

2014/0174733 A1* 6/2014 Gadot ................. E21B 41/0085
166/264
2016/0341587 A1* 11/2016 Huang ................. E21B 47/101
2017/0051606 A1* 2/2017 Fanini .................... E21B 47/10

* cited by examiner

MEASUREMENT DEVICE HAVING A PLURALITY OF SENSORS DISPOSED IN MOVABLE ARMS

CROSS REFERENCE TO RELATED APPLICATIONS

This application claims the benefit of U.S. Provisional Application No. 62/741,464, filed Oct. 4, 2018, the contents of which is hereby incorporated by reference in its entirety.

FIELD

The present technology pertains to a measurement device operable to track fluid flow parameters. In particular, the present disclosure relates to a system and method for monitoring various parameters of a dynamic fluid flow using a measurement device having a plurality of sensors disposed on one or more moveable arms.

BACKGROUND

Current devices used for monitoring fluid flow parameters within a fluidic channel typically include one of a single line of sensors spaced along the diameter of the channel or a plurality of sensors embedded in the side of the fluidic channel Sensor arrangements, such as those dispersed along the diameter of the fluidic channel, are not hydrodynamic and can disrupt the fluid flow throughout the area to be measured, which can result in erroneous readings and inaccurate information. Additionally, in systems where sensors are embedded within the walls of the fluidic channel, the sensors are spread out over a wide area, which can be insufficient to obtain a full understanding of the fluid flow properties throughout the fluidic channel. Collection of limited data as described can lead to inefficient and inaccurate measurements of the dynamic flow.

BRIEF DESCRIPTION OF THE DRAWINGS

In order to describe the manner in which the above-recited, and additional, advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Commonly used downhole fluid flow sensors are disposed in a one-dimensional manner within a fluid channel. For example, sensors are disposed in a single line, across the diameter of the channel, or disposed around or embedded in the side of the fluidic channel Additionally, sensors can be spread out over large distances resulting in non-concurrent measurements of the flow within the fluidic channel Such methods provide only a small amount of information regarding the fluid parameters. Failure to obtain information at all points throughout the wellbore can cause errors in calculations relating to flowrate, phase yield, and various other measurements relating to fluid flow which are critical to the stability of the fluidic channel.

Disclosed herein is a sensor arrangement for providing measurements relating to a multi-dimensional area. The multi-dimensional measurement system can provide data for all points throughout a cross-sectional area of the fluidic channel. As such, the measurement device described herein provides a sensor arrangement which allows for a significantly larger amount of data to be obtained.

Specifically, the present disclosure is drawn to a system, method, and apparatus for measuring fluid flow parameters within a fluidic channel. The system and method can use an apparatus such as a hydrodynamic measurement device comprising a plurality of sensors operable to provide flow parameter data throughout the cross-sectional area of the fluidic channel Measurement devices as described herein can be disposed within any fluidic channel including, but not limited to, a pipe, a conduit, a wellbore, and the like. The measurement device described herein can include at least a central body, one or more movable arms, and a plurality of sensors disposed throughout the central body and along the length of the one or more movable arms. The movable arms can be controlled via an actuator to expand out from, and contract towards, the central body of the device. Additionally, the measurement device disclosed herein can be hydrodynamically designed in order to reduce disturbances within the fluid flow both in the fluidic channel and around the measurement device. In at least one example, the plurality of sensors disposed throughout the measurement device can be arranged such that the sensors are parallel to the flow of the fluidic channel.

The term "sensor" as used herein refers to any device operable to measure and transmit information regarding the immediate surroundings. For example, sensors used in accordance with this disclosure can be operable to detect one or more parameters of a fluid flow including, but not limited to, a fluid flow rate, fluid velocity, fluid level, fluid phase or ID (oil/water/gas), fluid density, pressure within the fluidic channel, and the like.

The term "actuator" as used herein refers to any device configured to modify the behavior of the device, or the behavior of other devices, in response to receiving a command signal.

Figure 1A:
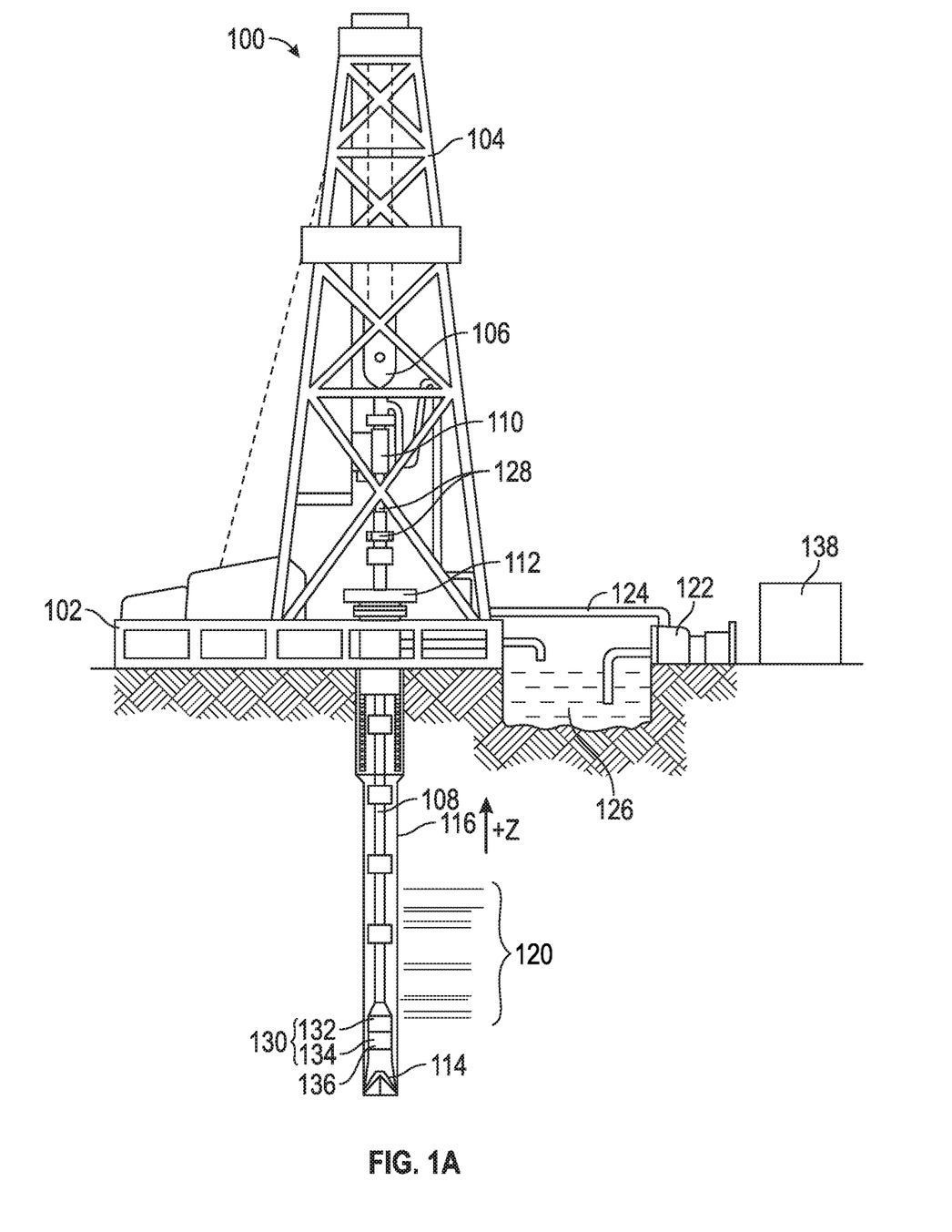
FIG. 1A is a schematic diagram of an exemplary logging while drilling environment in which a measurement device as described herein can be used.
Figure 1B:
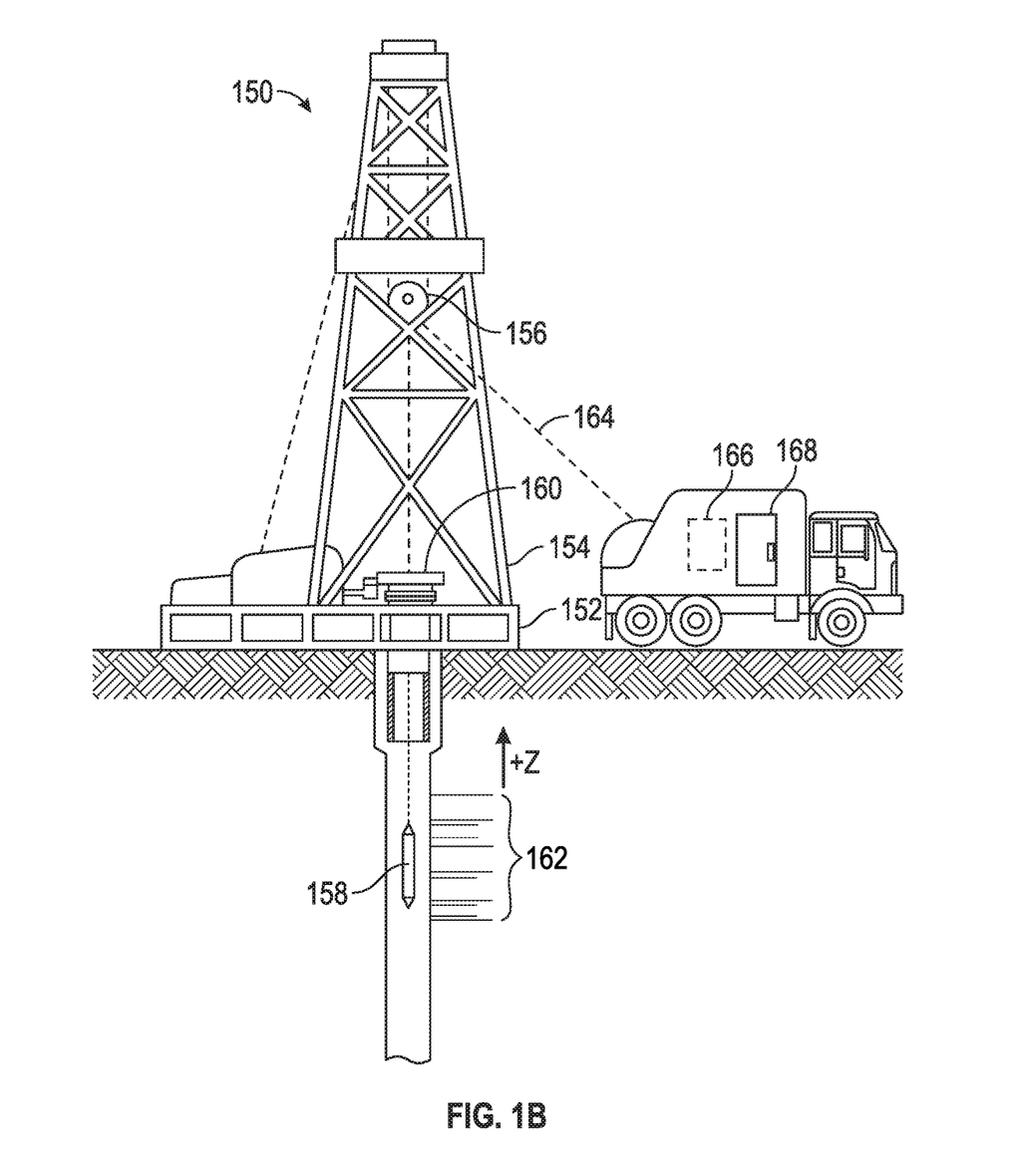
FIG. 1B is a schematic diagram of an exemplary conveyance logging wellbore environment in which a measurement device as described herein can be used.

FIGS. 1A and 1B illustrate exemplary wellbore environments in which the disclosed hydrodynamic measurement device can be used. For example, FIG. 1A illustrates a diagrammatic view of an exemplary logging while drilling (LWD) and/or measurement while drilling (MWD) wellbore operating environment 100 in which the measurement device can be implemented. As depicted in FIG. 1A, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 106 is a drill bit 114. As the drill bit 114 rotates, the drill bit 114 creates a wellbore 116 that can pass through various subterranean formations 120. The wellbore 116 can be formed according to a desired well plan having one or more vertical, curved, and/or horizontal portions extending through one or more subterranean formations 120. The complexity of well construction leads to challenges in determining the amount and phase of the fluid flowing through the wellbore. A pump 122 circulates drilling fluid through a supply pipe 124 to top drive 110, down through the interior of drill string 108, through orifices in drill bit 114, back to the surface via the annulus around drill string 108, and into a retention pit 126. The drilling fluid transports cuttings from the wellbore 116 into the pit 126 and aids in maintaining the integrity of the wellbore 116. Various materials can be used for drilling fluid, including oil-based fluids and water-based fluids.

As depicted in FIG. 1A, logging tools 134 can be integrated into the bottom-hole assembly 130 near the drill bit 114. As the drill bit 114 extends the wellbore 116 through the subterranean formations 120, logging tools 134 collect measurements relating to the various formation properties as well as the orientation of the tool and various other drilling conditions. The bottom hole assembly 130 can include one or more logging tools 134. In at least one example, one of the logging tools 134 of the bottom hole assembly 130 can include a measurement device 200 as described herein. Further details of the measurement device 200 are provided with respect to FIGS. 2A-2G. The bottom-hole assembly 130 may also include a telemetry sub 132 to transfer measurement data to a surface receiver 128 and to receive commands from the surface. In some example, the telemetry sub 132 communicates with a surface receiver 128 using mud pulse telemetry. In other cases, the telemetry sub 132 does not communicate with the surface, but rather stores logging data for later retrieval at a logging facility 138 on the surface when the logging assembly is recovered. Notably, one or more of the bottom-hole assembly 130, the logging tools 134, and the telemetry sub 132 may also operate using a non-conductive cable (for example, slickline, etc.) with a local power supply, such as batteries and the like. When employing non-conductive cable, communication may be supported using, for example, wireless protocols (for example, EM, acoustic, etc.) and/or measurements and logging data may be stored in local memory for subsequent retrieval at the surface logging facility 138, as is appreciated by those skilled in the art.

Each of the logging tools 134 may include a plurality of tool components, spaced apart from each other, and communicatively coupled with one or more wires. Logging tools 134 may include measurement devices, such as the one shown in FIG. 2A, in order to gather fluid flow parameter data. The telemetry sub 132 may include one or more of wireless telemetry or logging capabilities to collect and/or transmit information indicative of received logging data to operators on the surface or for later access and data processing for the evaluation of fluid flow within the wellbore.

The logging tools 134 may also include one or more computing devices 136 communicatively coupled with one or more of the plurality of tool components. The computing device 136 may be configured to control or monitor the performance of the tools 134, process logging data, and/or carry out the methods of the present disclosure. In at least one example, the computing device 136 can be operable to receive a signal to control one or more of the plurality of tool components.

In some examples, one or more of the logging tools 134 may communicate with a surface receiver 128, such as a wired drill pipe. In other cases, the one or more of the logging tools 134 may communicate with a surface receiver 128 by wireless signal transmission including, but not limited to, pressure wave transmission (such as mud pulse and continuous wave telemetry), acoustic energy transmission, and electromagnetic wave transmission. In at least some cases, one or more of the logging tools 134 may receive electrical power from a wire that extends to the surface, including wires extending through a wired drill pipe. In at least some instances the methods and techniques of the present disclosure may be performed by a computing device (not shown) on the surface. In some examples, the computing device may be included in surface receiver 128. For example, surface receiver 128 of wellbore operating environment 100 may include one or more of wireless telemetry, processor circuitry, or memory facilities, such as to support substantially real-time processing of data received from one or more of the logging tools 134. In some examples, data is processed at some time subsequent to its collection, wherein the data may be stored on the surface at surface receiver 128, stored downhole in telemetry sub 132, or both, until it is retrieved for processing. In an alternative example, the telemetry sub 132 can include a computing device operable to perform preprocessing of the data downhole. In yet another embodiment, the telemetry sub 132 can include a computing device downhole operable to perform preprocessing of the data, which can then be further processed at the surface.

While FIG. 1A indicates that the wellbore is in the drilling stage, the hydrodynamic measurement device described herein can be used at any stage throughout the life of a wellbore. For example, the measurement device can be lowered into a wellbore after drilling is completed, the measurement device can be lowered from a tractor using a logging string, coiled tubing, electric line, slick line, or any other suitable means of lowering a tool into a wellbore. Additionally, the hydrodynamic measurement device 200 disclosed herein can be used throughout the production period of a wellbore in order to provide up-to-date information regarding the fluid phase, flow rate, and other relevant properties throughout the production process.

For example, FIG. 1B illustrates a diagrammatic view of a conveyance logging wellbore environment 150 in which the measurement device disclosed herein may be implemented. As depicted in FIG. 1B, a hoist 156 may be included as a portion of a platform 152, such as that coupled to derrick 154, and used with a conveyance 164 to raise or lower equipment such as logging tool 158 into or out of a borehole surrounded by formation 162. The logging tool 158 can include a measurement device 200 as described herein, additional details of the measurement device 200 are provided with respect to FIGS. 2A-2G. In at least one example, the conveyance 164 may provide a communicative coupling between the logging tool 158 and a logging facility 168 at the surface. The conveyance 164 may include one or more wires, slicklines, cables, or the like, as well as tubular conveyances such as coiled tubing, joint tubing, or other tubulars, and may include a downhole tractor. Additionally, power can be supplied via the conveyance 164 to meet the power requirements of the logging tool. In the alternative, logging tool 158 can include a local power supply, such as batteries, downhole generator and the like. As described above, when employing non-conductive cable, coiled tubing, pipe string, or downhole tractor, communication may be supported using, for example, wireless protocols (such as EM, acoustic, etc.), and/or measurements and logging data may be stored in local memory for subsequent retrieval. Additional devices can be disposed downhole along with the logging tool including, but not limited reservoir measuring devices. Direct measurements of reservoir properties and other fluid and reservoir characteristics can be used to improve the analysis described herein. Such measuring device can include, but are not limited to, a borehole sampler.

The logging facility 168 may include a computing device 166 capable of carrying out the methods and techniques of the present disclosure, including collecting and analyzing data gathered from the measurement device. In this manner, information regarding the fluid flow parameters may be obtained by the measurement device (logging tool 158) and processed by a computing device, such as computing device 166. In some examples, computing device 166 can be equipped to process the received information in substantially real-time, while in other examples, computing device 166 can be equipped to store the received information for processing at a later time. The computing device 166 can be, for example, a computing system as described in more detail with respect to FIGS. 4 and 5. In an alternative example, the logging tool 158 can include a computing device 166 operable to process the logging data obtained downhole. As described above, in at least one example a portion of processing may occur via a computing device 166 downhole and additional computing can be performed on a computing device 166 on the surface.

Modifications, additions, or omissions may be made to FIGS. 1A and 1B without departing from the spirit and scope of the present disclosure. For example, FIGS. 1A and 1B depict components of the wellbore operating environments in a particular configuration. However, any suitable configuration of components may be used. Furthermore, fewer components, or additional components beyond those illustrated, may be included in the wellbore operating environment without departing from the spirit and scope of the present disclosure. It should be noted that while FIGS. 1A and 1B generally depict a land-based operation, those skilled in the art would readily recognize that the principles described herein are equally applicable to operations that employ floating or sea-based platforms and rigs or sub-sea operations, without departing from the scope of the disclosure. Also, even though FIGS. 1A and 1B depict a vertical wellbore, the present disclosure is equally well-suited for use in wellbores having other orientations, including horizontal wellbores, slanted wellbores, multilateral wellbores or the like.

Figure 2A:
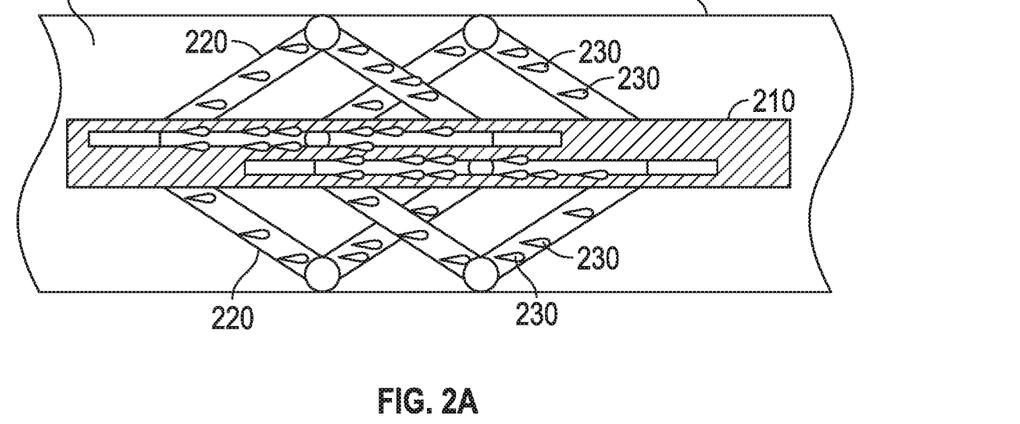
FIGS. 2A-2G illustrate schematic diagrams showing various elements of a measurement device in accordance with the present disclosure.
Figure 2B:
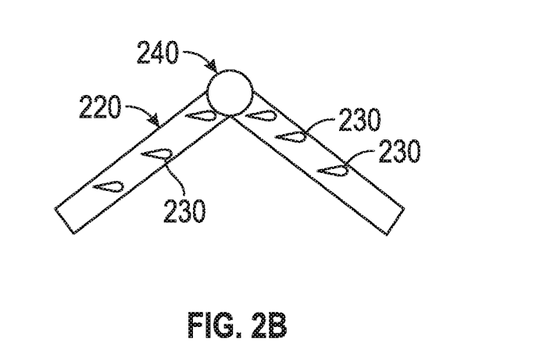

As stated above, the logging tools 134,158 described in FIGS. 1A and 1B can include a measurement device 200. An exemplary measurement device, and various features thereof are illustrated in FIGS. 2A-2G. Specifically, FIG. 2A is a schematic illustrating an exemplary measurement device 200 as described herein. The measurement device 200 can include, at least, a hydro-dynamically designed central body 210, one or more moveable arms 220 operable to be expanded from and retracted to the central body 210, and a plurality of sensors 230 disposed throughout the central body and along the one or more arms. The hydrodynamic body is engineered to reduce disturbances in the flow path where the measurements are being made. In at least one example, the movable arms can be coupled with the central body in a rigid alignment, such as through a cog system. In the alternative, the movable arms can be coupled using a non-rigid alignment. The movable arms as described herein are operable to expand radially outward from the central body towards the sidewalls of the fluidic channel 205 formed by tubular 215 in order to increase the measurement area by placing sensors throughout the flow channel FIG. 2B is a schematic illustrating an enlarged view of an exemplary movable arm 220. In at least one example, the movable arm 220 can include contacts 240 at a bend point along the length of the movable arm 220. The movable arms can be designed to fit any desired fluidic channel. In at least one example, the movable arms of the measurement device can expand to provide an outer diameter of about one and eleven-sixteenths inches. The measurement device described herein can provide users with a sensor placement having a known distance from the center of the wellbore. Suitable contacts 240 can include, but are not limited to, rollers, wheels, skids, balls, or any other means capable of reducing friction at the contact point between the moveable arm and the side, or wall, of the fluidic channel. For example, such contacts can assist in the reduction of drag and friction as the measurement device is moved along the fluidic channel. As such, contacts 240 as described herein can allow for more efficient logging due to the increased mobility of the measurement device within the fluidic channel. For example, the moveable arms 220 can be expanded outward from the central body 210 until the contacts 240 abut the sidewall of a fluidic channel; then contacts, such as smooth rollers or wheels, can allow the measurement device to glide along the fluidic channel without significant resistance. The reduction in sticks and pulls created as the measurement device moves throughout the fluidic channel can allow for increased accuracy and repeatability of data collection.

Figure 2C:
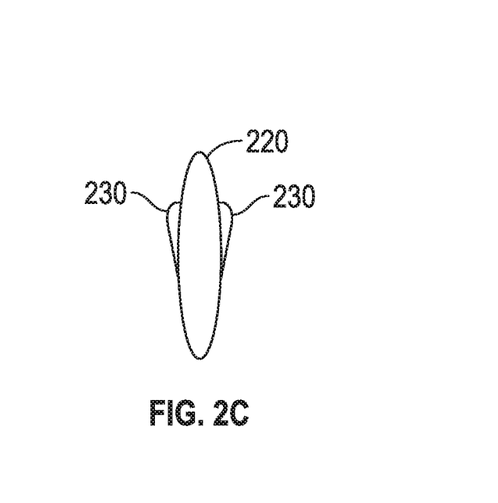

As described above, each of the plurality of movable arms 220 can include a plurality of sensors 230 spaced along the length of the arm. In at least one example the sensors are symmetrically located on each side of the measurement device. FIG. 2C illustrates a cross-sectional view of an exemplary moveable arm having a symmetrical sensor arrangement. In an alternative example the sensors can be placed such that they are not symmetrically located on each side of the measurement device. The placement of the sensors on each of the movable arms can allow for strategic placement of the sensors throughout the fluidic channel can reduce inaccuracies within flow channels having non-standard flow profiles or cross-sectional areas. Each of the plurality of sensors 230 can include a sensor node operable to align the sensor with the fluid flow 250, as shown in FIG.

Figure 2D:
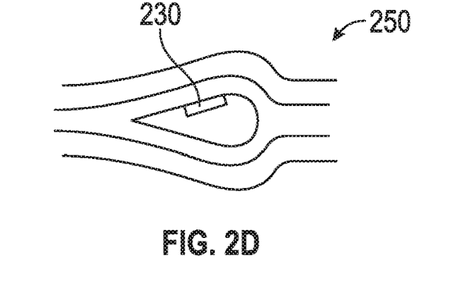

2D. In at least one example, the sensors can be gimballed or include a mechanism which allows them to align with the flow direction or align parallel with the fluidic channel.

Figure 2E:
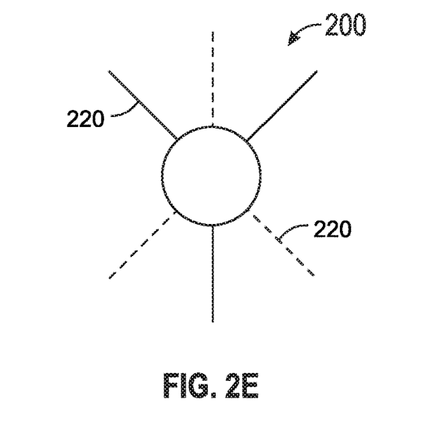

The movable arms 220 described herein can provide for strategic placement of the sensors throughout the fluidic channel. For example, FIG. 2E illustrates a cross-sectional view of the measurement device 200 having the plurality of arms 220 expanded outward from the central body. The placement of the arms can increase the accuracy of flow measurements within fluid channels. While FIG. 2E illustrates each of the plurality of arms 220 extended outwards from the central body the same distance, it should be noted that each of the moveable arms 220 can move independently. As such, each of the plurality of arms 220 can be expanded at various distances from the central body allowing for measurements to be obtained in channels having non-standard flow profiles or cross-sectional areas. Additionally, the plurality of arms 220 do not have to be arranged in a particular manner about the central body 210. For example, a first portion of the plurality of arms, such as those shown in solid lines in FIG. 2E, can be configured to be staggered with respect to a second portion of the plurality of arms, such as those shown in dashed lines, allowing for fluid to flow more dynamically between and around the arms. Such arrangements can allow for multiple sensors to be placed at various points throughout the fluidic flow channel and communicatively coupled with one another in order to obtain an increased flow profile throughout the channel.

Figure 2F:
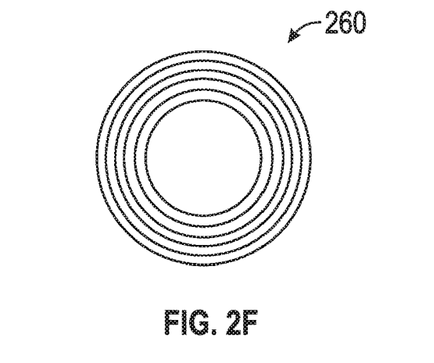

As described above, the one or more movable arms can move independently from one another. Additionally, each of the moveable arms can be configured to collect different, specific fluid parameter measurements at each sensor. For example, the sensors in the measurement device can be operable to detect one or more of fluid velocity, fluid density, fluid temperature, optical ID, and spinner. Furthermore, when the movable arms are expanded outward from the central body of the measurement device, the plurality sensors are distributed at various points throughout the cross-sectional area of the fluidic channel. For example, the plurality of sensors can be located at various distances from the center of the fluidic channel, on the central body of the measurement device, and abutting the sidewall of the fluidic channel Such sensor arrangement can provide a thorough, multi-dimensional evaluation 260 of the fluid parameters at all points throughout the fluid channel, as shown in FIG. 2F. The one or more movable arms 220 can be powered, such that they can be controlled via an actuator to expand and contract from the central body 210. In the alternative, the central body 210 can be configured such that grooves are located along the body so that, when in the contracted configuration, the one or more movable arms 220 lay within the grooves, providing a smooth, hydrodynamic surface. Such design can allow for less restricted movement of the measurement device throughout the fluidic channel Where the arms are configured to fold into the central body, the measurement device can be sized such that it can easily pass through the smallest diameter of the fluidic channel when contracted. Such design can allow the same measurement device to be used in fluidic channels of various sizes, allowing the device to be placed at a desired location within the channel and easily removed when in the closed configuration. The ability to adjust the one or more movable 220 arms, and thus the placement of the sensors 230 within the fluidic channel, as the channel changes in cross-sectional area greatly increases the amount of information collectable by the downhole sensors. Such changes allow for the measurement device 200 to be disposed in areas of a fluidic channel 205 which were previously unable to be monitored.

Specifically, the design of the measurement device 200 allowing for the flexible placement of sensors described herein can offer several different methods to analyze collected data. In a method where a full analysis is not necessary only a portion of the plurality of sensors 230 can be used to gather information. For example, the outside sensors, such as those near the side of the fluidic channel 205, can be used. In such a partial analysis, the data gathered would allow for a fluid flow analysis to be performed based on circumferential outer sensors and one inner sensor, similar to the processes used currently. In an alternative example, data can be obtained using only sensors placed such that the data points are in a single line across the diameter of the fluidic channel 205. Such arrangement can be made vertically or in a horizontal plane. In an alternative method, data obtained from all sensors within the measurement device can be used to gather information. Such method can allow for the collection of improved logging data and fluid measurement accuracy.

Figure 3A:
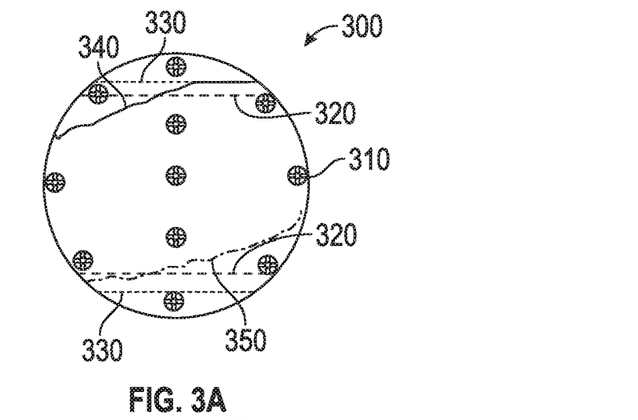
FIGS. 3A-3C illustrate various flow patterns that can be measured using the measurement device described herein.
Figure 3B:
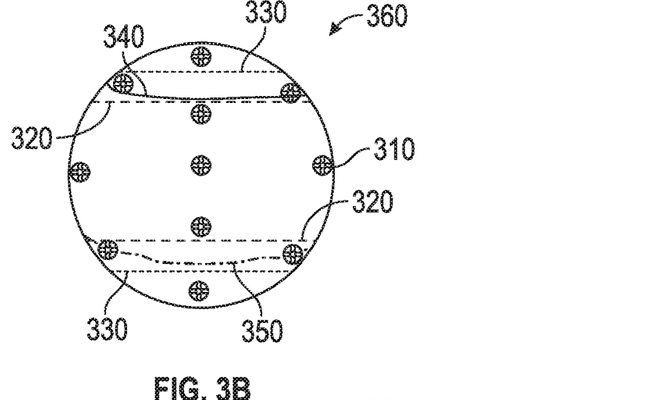
Figure 3C:
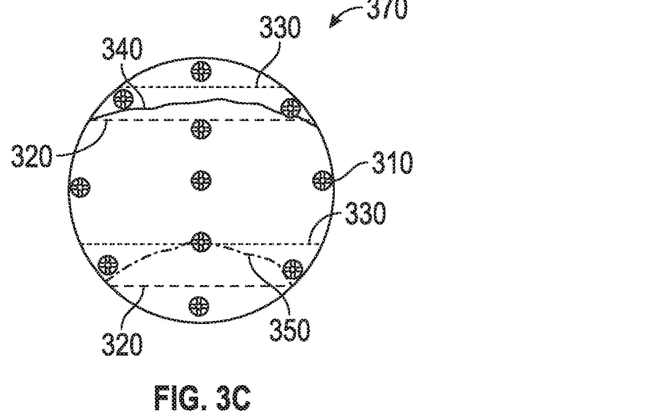

For example, horizontal wellbores can require that the measurement device 200 be able to curve around or have influences from incoming fluids from the reservoir. Such changes in orientation and shape can prevent traditional measurement devices from reaching certain portions of the wellbore. The presently described measurement device 200 is operable to evaluate sections of the channel where useful data may be obtained. For example, FIGS. 3A-3C illustrate exemplary fluidic channels having flow profiles which would benefit from the use of the measurement device 200 described herein. Specifically, FIG. 3A illustrates a fluidic channel 300 having a plurality of sensors 310 placed therein. Lines 340 and 350 illustrate the oil/gas contact in flow and the water/oil contact in flow, respectively, within the fluidic channel 300. Line 320 illustrates the estimated flow where data was only obtained from a single line along the diameter of the fluidic channel 300. In the alternative, line 330 illustrates the estimated flow where data was obtained using only circumferential data. As illustrated, sensor placement can have a significant effect on the resulting fluid flow analysis. As indicated in the examples, when data is only retrieved from a small area it can fail to provide a true indication of the flow data. A measurement device 200, as disclosed herein, which provides sensors throughout the entire cross-sectional area of the wellbore can provide a multi-dimensional analysis of the wellbore. Such device provides significantly more accurate data regarding fluid flow parameters. Specifically, the disclosed measurement device 200 can include sensors on the central body of the device providing data of the whole stream, as well as sensors dispersed throughout the area between the central body and the side of the fluidic channel as illustrated in FIG. 2F. FIGS. 3B and 3C illustrate alternative fluidic channels 360,370, respectively, where the fluid flow patterns 340,350 which would benefit from the measurement device 200.

The measurement device 200 described herein can be used to collect data throughout various points within a wellbore. For example, the measurement device 200 can be deployed downhole in the retracted configuration. When the measurement device 200 reaches a desired measurement location a signal can be sent from a computing device 136,166 to the measurement device 200 to actuate the one or more movable arms 220. Once the one or more movable arms 220 are expanded from the central body 210 of the measurement device 200, the device can begin recording fluid flow data. As described above, the measurement device 200 can include contacts that allow for reduced disturbances as the measurement device 200 moves throughout the fluidic channel 205; as such the measurement device 200 can be used to take measurements throughout several points within the fluidic channel 205. The one or more movable arms 220 of the measurement device 200 allow the device to move through deviated and horizontal wellbores which are curved at one or more points within the fluidic channel 205. Once the desired data collection is complete, a signal can be sent from a computing device 136,166 to retract the one or more movable arms 220 back into the central body 210 of the measurement device 200 and the measurement device 200 can be retracted.

As fluid moves through a fluidic channel, materials and sediments within the fluid can cause buildup along the sides of the channel as well as around items disposed therein, including a measurement device. The buildup can include, for example, an increase of paraffin, mudcake, particulate, sludge, or other debris. In at least one example, devices, sensors, and other downhole components can get debris or sludge built up around the devices, causing inaccuracies in the collected measurements. Unless the devices are cleaned, the measurements obtained via the sensors will not provide the accurate information. Typically, traditional measurement devices are required to be removed from the wellbore once the device or sensors have gathered too much buildup to provide useful data, which can result in delays and significant costs.

Figure 2G:
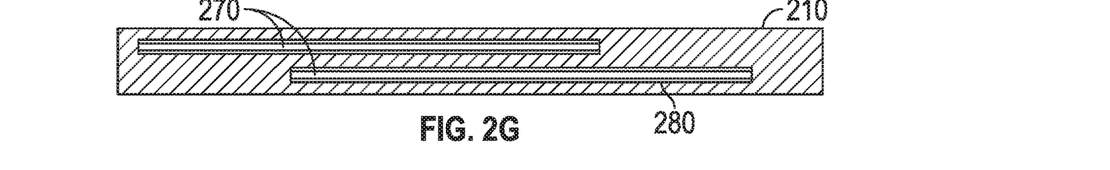

In at least one embodiment, the measurement device 200 disclosed herein can be configured to be self-cleaning. For example, the measurement device 200 can be operable to remove buildup from the measurement device 200 while disposed downhole. Specifically, as shown in FIG. 2G, the measurement device 200 can be configured such that when in the contracted configuration the one or more movable arms 220 are disposed within slots 270 formed in the central body 210 of the measurement device 200. In at least one example, the measurement device 200 can include one or more cleaning members 280 coupled with the edge of the slots 270 of the central body 210 such that the arms are contacted by the cleaning members 280 as they pass into the central body 210. Such cleaning members 280 allow the measurement device 200 to clean and remove debris and other build up from the plurality of sensors 230 while disposed within a fluidic channel. The cleaning members 280 can include, but are not limited to, a brush, a scraper, an abrasive, a rubber brush, a squeegee, and any other suitable cleaning device that would not damage the sensors. Such self-cleaning measurement device disclosed herein can provide for increased accuracy, improved measurements, and can significantly increase the useful life span of the plurality of sensors 230.

Figure 4:
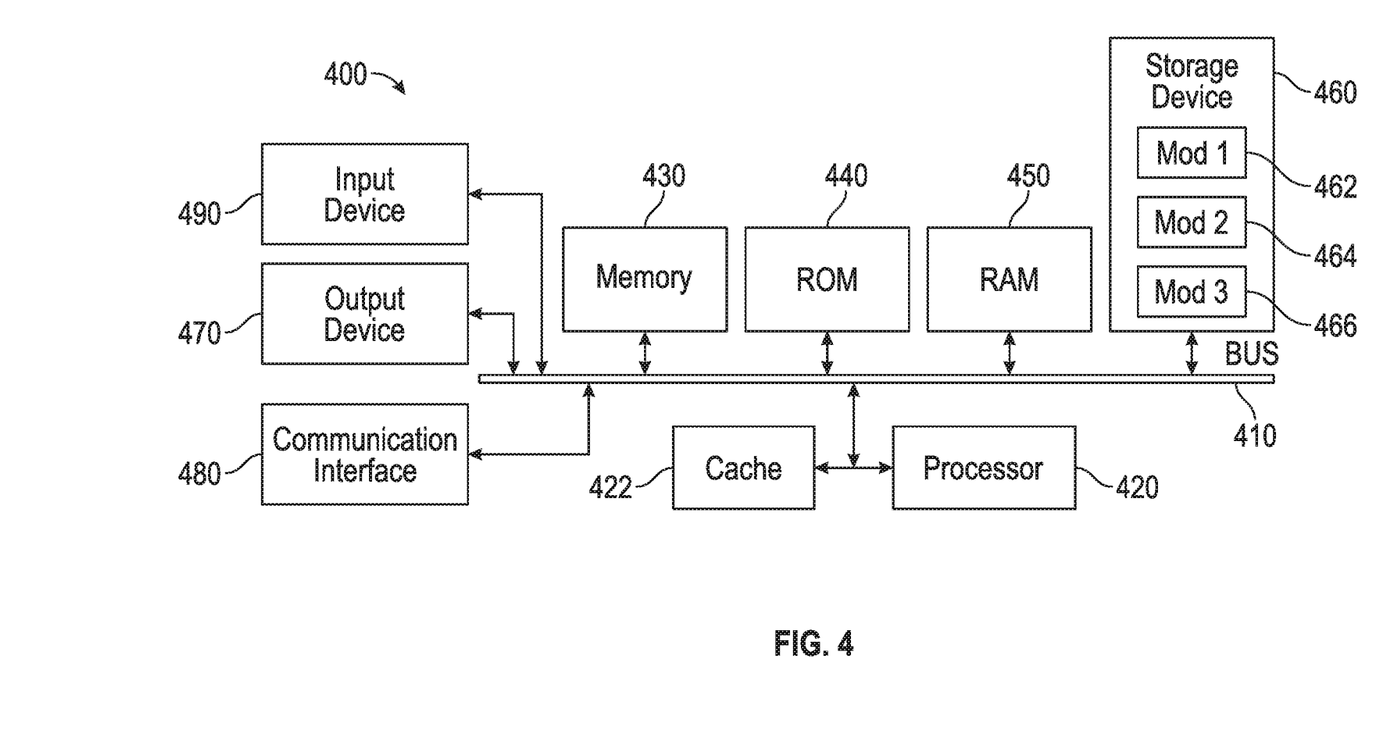
FIG. 4 is an illustration depicting a conventional system bus computing system architecture, according to an exemplary embodiment.
Figure 5:
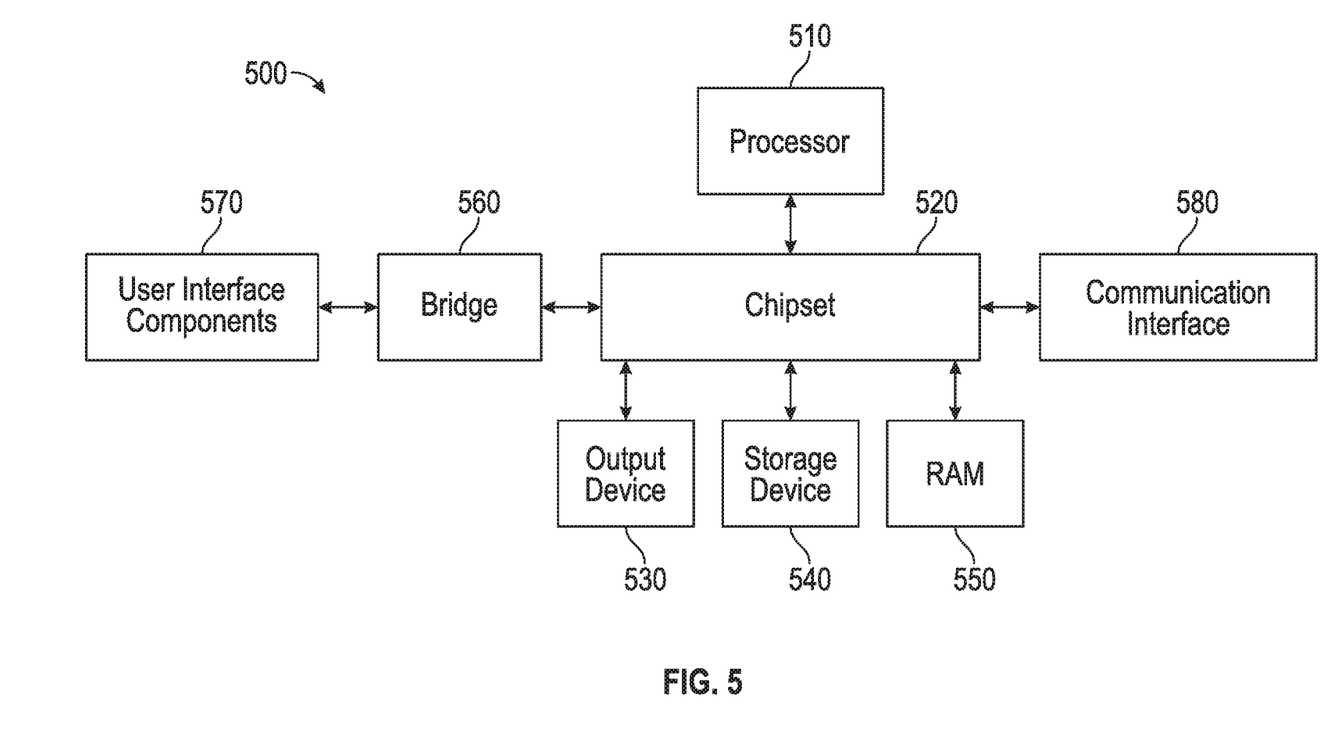
FIG. 5 is an illustration depicting a computer system having a chipset architecture, according to an exemplary embodiment.

Both the one or more movable arms 220 and the plurality of sensors 230 can be coupled with a computing device 136,166 operable to measure various fluid parameters. As described above, in at least one embodiment, the plurality of sensors 230 can be coupled with a computing device 136, 166 to store the data obtained downhole for later review. In the alternative, the plurality of sensors 230 can be coupled with a computing device 136,166 via wired or wireless communication such that the data can be instantly and continuously reviewed. The computing device 136,166 may include any suitable computer, controller, or data processing apparatus capable of being programmed to carry out the method, system, and apparatus as further described herein. FIGS. 4 and 5 illustrate exemplary computing device embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

The computing devices 136,166 described in FIGS. 1A and 1B can include the computing devices as shown and described in FIGS. 4 and/or 5. The computing device can be used to store, receive, and analyze data gathered downhole by the measurement device 200, as described above.

Specifically, FIG. 4 illustrates a computing device comprising a system bus computing system architecture 400 wherein the components of the system are in electrical communication with each other using a bus 410. Computing device 400 can include a processing unit (CPU or processor) 420 and a system bus 410 that couples various system components including the system memory 430, such as read only memory (ROM) 440 and random access memory (RAM) 450, to the processor 420. The computing device 400 can include a cache of high-speed memory connected directly with, in close proximity to, or integrated as part of the processor 420. The computing device 400 can copy data from the memory 430 and/or the storage device 460 to the cache 422 for quick access by the processor 420. In this way, the cache 422 can provide a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as first module 462, second module 646, and third module 466 stored in storage device 460, configured to control the processor 420 as well as a special-purpose processor where software instructions are incorporated into the actual processor design. The processor 420 may essentially be a completely self-contained computing device, containing multiple cores or processors, a bus, memory controller, cache, etc. A multi-core processor may be symmetric or asymmetric.

The system bus 410 may be any of several types of bus structures including a memory bus or a memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 460 can include software modules 462, 464, 466 for controlling the processor 420. The computing device 400 can include other hardware or software modules. The storage device 460 is connected to the system bus 410 by a drive interface. The drives and the associated computer-readable storage devices provide non-volatile storage of computer-readable instructions, data structures, program modules and other data for the computing device 400. In one aspect, a hardware module that performs a particular function includes the software components shorted in a tangible computer-readable storage device in connection with the necessary hardware components, such as the processor 420, bus 410, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the computing device 400 is a small, handheld computing device, a desktop computer, or a computer server. When the processor 420 executes instructions to perform "operations", the processor 420 can perform the operations directly and/or facilitate, direct, or cooperate with another device or component to perform the operations.

To enable user interaction with the computing device 400, an input device 490 can represent any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems can enable a user to provide multiple types of input to communicate with the computing device 420. The communications interface 480 can generally govern and manage the user input and system output. There is no restriction on operating on any particular hardware arrangement and therefore the basic features here may easily be substituted for improved hardware or firmware arrangements as they are developed.

Storage device 460 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 450, ROM 440, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The computing device 400 shown in FIG. 4 can practice all or part of the recited methods, can be a part of the recited systems, and/or can operate according to instructions in the recited tangible computer-readable storage devices.

One or more parts of the example computing device 400, up to and including the entire computing device 400, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 420 can include all types of processors disclosed herein, including a virtual processor. However, when referring to a virtual processor, the processor 420 includes the software components associated with executing the virtual processor in a virtualization layer and underlying hardware necessary to execute the virtualization layer. The computing device 400 can include a physical or virtual processor 420 that receives instructions stored in a computer-readable storage device, which causes the processor 420 to perform certain operations. When referring to a virtual processor 420, the system also includes the underlying physical hardware executing the virtual processor 420.

FIG. 5 illustrates an alternative example computer device 500 having a chipset architecture that can be used in executing the described method and generating and displaying a graphical user interface (GUI). Computer device 500 can be computer hardware, software, and firmware that can be used to implement the disclosed technology. Computing device 500 can include a processor 510, representative of any number of physically and/or logically distinct resources capable of executing software, firmware, and hardware configured to perform identified computations. Processor 510 can communicate with a chipset 520 that can control input to and output from processor 510. Chipset 520 can output information to output device 530, such as a display, and can read and write information to storage device 540, which can include magnetic media, and solid state media. Chipset 520 can also read data from and write data to RAM 550. A bridge 560 for interfacing with a variety of user interface components 570 can include a keyboard, a microphone, touch detection and processing circuitry, a pointing device, such as a mouse, and so on. In general, inputs to computing device 500 can come from any of a variety of sources, machine generated and/or human generated.

Chipset 520 can also interface with one or more communication interfaces 580 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 510 analyzing data stored in storage 540 or RAM 550. Further, the machine can receive inputs from a user via user interface components 570 and execute appropriate functions, such as browsing functions by interpreting these inputs using processor 510.

It can be appreciated that computing devices 400 and 500 can have more than one processor 420,510 or be part of a group or cluster of computing devices networked together to provide processing capability. For example, the processor 420,510 can include multiple processors, such as a system having multiple, physically separate processors in different sockets, or a system having multiple processor cores on a single physical chip. Similarly, the processor 420,510 can include multiple distributed processors located in multiple separate computing devices, but working together such as via a communications network. Multiple processors or processor cores can share resources such as memory 430 or the cache 422, or can operate using independent resources. The processor 420 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example, the functions of one or more processors represented in FIGS. 4 and/or 5 may be provided by a single shared processor or multiple processors. The term "processor" as used herein should not be construed to refer exclusively to hardware capable of executing software. Illustrative embodiments may include microprocessor and/or digital signal processor (DSP) hardware, ROM 440 for storing software performing the operations described below, and RAM 450 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Numerous examples are provided herein to enhance understanding of the present disclosure. A specific set of statements are provided as follows.

Statement 1: A measurement device comprising a hydrodynamic central body; a plurality of arms coupled with the hydrodynamic central body, the plurality of arms operable to extend from and retract to the hydrodynamic central body; and a plurality of sensors disposed within the hydrodynamic central body and distributed along the length of the plurality of arms.

Statement 2: A measurement device in accordance with Statement 1, wherein the hydrodynamic central body further comprises a plurality of slots, each of the plurality of slots being sized to fit one of the plurality of arms therein.

Statement 3: A measurement device in accordance with Statement 1 or Statement 2, wherein the hydrodynamic central body further comprises one or more cleaning members coupled with the edge of each of the plurality of slots.

Statement 4: A measurement device in accordance with Statements 1-3, wherein the one or more cleaning members are sized to contact the plurality of movable arms as they retract into and expand from the hydrodynamic central body.

Statement 5: A measurement device in accordance with Statements 1-4, wherein the cleaning member is a brush, a scraper, an abrasive, a rubber brush, a squeegee, and any other suitable cleaning device.

Statement 6: A measurement device in accordance with Statements 1-5, wherein the plurality of sensors are configured to detect a plurality of dynamic fluid flow parameters.

Statement 7: A measurement device in accordance with Statements 1-6, wherein the plurality of dynamic fluid flow parameters includes a flow rate, a velocity, a fluid level, a fluid phase, a fluid ID, a density, and a pressure.

Statement 8: A measurement device in accordance with Statements 1-7, wherein each of the plurality of arms are operable to move independent of one another.

Statement 9: A measurement device in accordance with Statements 1-8, wherein each of the plurality of arms further includes a contact along the length of each of the plurality of arms.

Statement 10: A measurement device in accordance with Statements 1-9, wherein the contact is selected from the group including of a roller, a wheel, a skid, and a ball.

Statement 11: A measurement device in accordance with Statements 1-10, wherein the plurality of sensors disposed along the length of each of the plurality of arms are arranged symmetrically.

Statement 12: A measurement device in accordance with Statements 1-10, wherein the plurality of sensors disposed along the length of each of the plurality of arms are arranged asymmetrically.

Statement 13: A measurement device in accordance with Statements 1-12, wherein each of the plurality of sensors is operable to align itself with a fluid flow.

Statement 14: A measurement device in accordance with Statements 1-13, wherein each of the plurality of sensors is operable to detect a different one of each of the plurality of fluid flow parameters.

Statement 15: A method for measuring fluid flow comprising disposing a measurement device within a fluidic channel, the measurement device comprising a hydrodynamic central body, a plurality of arms coupled with the hydrodynamic central body, the plurality of arms operable to extend from and retract to the hydrodynamic central body, and a plurality of sensors disposed within the hydrodynamic central body and distributed along the length of the plurality of arms; triggering, via an actuator of the measurement device, the plurality of arms to expand from the hydrodynamic central body until a portion of each of the plurality of arms abut a sidewall of the fluidic channel; collecting, via the plurality of sensors, measurements relating to one or more fluid flow parameters within the fluidic channel; and triggering, via the actuator, the plurality of arms to contract inwards to the hydrodynamic central body of the measurement device.

Statement 16: A method in accordance with Statement 15, further comprising storing the collected one or more fluid flow parameters in a memory of the measuring device.

Statement 17: A method in accordance with Statement 15 or Statement 16, further comprising transmitting the collected one or more fluid flow parameters to a logging facility.

Statement 18: A method in accordance with Statements 15-17, wherein the measurement device further comprises one or more cleaning members coupled with the central body and operable to clean the plurality of arms.

Statement 19: A method in accordance with Statements 15-18, further comprising cleaning the plurality of sensors by expanding and contracting the plurality of arms.

Statement 20: A method in accordance with Statements 15-19, further comprising adjusting the plurality of arms as the internal diameter of the fluidic channel changes.

Statement 21: A method in accordance with Statements 15-20, wherein the plurality of dynamic fluid flow parameters includes a flow rate, a velocity, a fluid level, a fluid phase, a fluid ID, a density, and a pressure.

Statement 22: A method in accordance with Statements 15-21, further comprising aligning each of the plurality of sensors with the fluid flow throughout the fluidic channel.

Statement 23: A method in accordance with Statements 15-22, wherein each of the plurality of sensors is operable to detect different fluid flow parameters.

Statement 24: A method in accordance with Statements 15-23, further comprising retracting the measurement device from the fluidic channel.

Statement 25: A method in accordance with Statements 15-24, wherein the fluidic channel is disposed within a wellbore.

Statement 26: A method in accordance with Statements 15-25, wherein the fluidic channel is disposed downhole.

Statement 27: A wellbore system comprising a fluidic channel disposed within a wellbore and operable to have a fluid flow therethrough, wherein the wellbore descends through an earth formation; a measurement device disposed within and movable throughout the fluidic channel, the measurement device comprising a hydrodynamic central body, a plurality of arms coupled with the hydrodynamic central body, the plurality of arms are operable to extend from and retract to the hydrodynamic central body, and a plurality of sensors disposed within the hydrodynamic central body and distributed along the length of the plurality of arms; and a control facility communicatively coupled with the measurement device, the control facility operable to receive one or more dynamic fluid flow parameters from the measurement device.

Statement 28: A wellbore system in accordance with Statement 27, further comprising a computing device communicatively coupled with the control facility, the computing device operable to control an actuator within the measurement device.

Statement 29: A wellbore system in accordance with Statement 27 or Statement 28, wherein the actuator is operable to control the plurality of arms.

Statement 30: A wellbore system in accordance with Statements 27-29, wherein the plurality of dynamic fluid flow parameters includes a flow rate, a velocity, a fluid level, a fluid phase, a fluid ID, a density, and a pressure.

Statement 31: A wellbore system in accordance with Statements 27-30, wherein the hydrodynamic central body further comprises a plurality of slots, each of the plurality of slots being sized to fit one of the plurality of arms therein.

Statement 32: A wellbore system in accordance with Statements 27-31, wherein the hydrodynamic central body further comprises one or more cleaning members coupled with the edge of each of the plurality of slots.

Statement 33: A wellbore system in accordance with Statements 27-32, wherein the one or more cleaning member are sized to contact the plurality of arms as they retract into the hydrodynamic central body.

Statement 34: A wellbore system in accordance with Statements 27-33, wherein the cleaning member is a brush, a scraper, an abrasive, a rubber brush, a squeegee, and any other suitable cleaning device.

Statement 35: A wellbore system in accordance with Statements 27-34, wherein each of the plurality of arms are operable to move independent of one another.

Statement 36: A wellbore system in accordance with Statements 27-35, wherein each of the plurality of arms further includes a contact along the length each of the plurality of arms.

Statement 37: A wellbore system in accordance with Statements 27-36, wherein the contact is selected from the group including of a roller, a wheel, a skid, and a ball.

Statement 38: A wellbore system in accordance with Statements 27-37, wherein the plurality of sensors disposed along the length of each of the plurality of arms are arranged symmetrically.

Statement 39: A wellbore system in accordance with Statements 27-37, wherein the plurality of sensors disposed along the length of each of the plurality of arms are arranged asymmetrically.

Statement 40: A wellbore system in accordance with Statements 27-38, wherein each of the plurality of sensors is operable to detect different fluid flow parameters.

Statement 41: A wellbore system in accordance with Statements 27-39, wherein the computing device further comprising at least one processor and a memory storing instructions thereof executable by at the at least one processor to triggering, via an actuator of the measurement device, the plurality of arms to expand from the hydrodynamic central body until a portion of each of the plurality of arms abut a sidewall of the fluidic channel; collecting, via the plurality of sensors, measurements relating to one or more fluid flow parameters within the fluidic channel; triggering, via the actuator, the plurality of arms to contract inwards to the hydrodynamic central body of the measurement device; and retracting the measurement device from the fluidic channel.

What is claimed is:

1. A measurement device comprising:
a hydrodynamic central body;
a plurality of arms coupled with the hydrodynamic central body, the plurality of arms operable to extend from and retract to the hydrodynamic central body;
a plurality of sensors disposed within the hydrodynamic central body and distributed along the length of each of the plurality of arms; and
wherein the hydrodynamic central body further comprises a plurality of slots, each of the plurality of slots being sized to fit one of the plurality of arms therein, and one or more cleaning members coupled with the edge of each of the plurality of slots.

2. The measurement device of claim 1, wherein the one or more cleaning members are sized to contact the plurality of arms as they retract into and expand from the hydrodynamic central body.

3. The measurement device of claim 1, wherein the plurality of sensors are configured to detect a plurality of dynamic fluid flow parameters.

4. The measurement device of claim 3, wherein the plurality of dynamic fluid flow parameters includes a flow rate, a velocity, a fluid level, a fluid phase, a fluid ID, a density, and a pressure.

5. The measurement device of claim 1, wherein each of the plurality of arms are operable to move independent of one another.

6. The measurement device of claim 1, wherein each of the plurality of arms further includes a contact along the length of the each of the plurality of arms.

7. A method for measuring fluid flow comprising:
disposing a measurement device within a fluidic channel, the measurement device comprising:
 a hydrodynamic central body,
 a plurality of arms coupled with the hydrodynamic central body, the plurality of arms operable to extend from and retract to the hydrodynamic central body;
 a plurality of sensors disposed within the hydrodynamic central body and distributed along the length of each of the plurality of arms; and
 one or more cleaning members coupled with the central body and operable to clean the plurality of arms;
triggering, via an actuator of the measurement device, the plurality of arms to expand from the hydrodynamic central body until a portion of each of the plurality of arms abut a sidewall of the fluidic channel;
collecting, via the plurality of sensors, measurements relating to one or more fluid flow parameters within the fluidic channel; and
triggering, via the actuator, the plurality of arms to contract inwards to the hydrodynamic central body of the measurement device.

8. The method of claim 7, further comprising storing the collected one or more fluid flow parameters in a memory of the measuring device.

9. The method of claim 7, further comprising transmitting the collected one or more fluid flow parameters to a logging facility.

10. The method of claim 7, further comprising cleaning the plurality of sensors by expanding and contracting the plurality of arms.

11. The method of claim 7, further comprising adjusting the plurality of arms as the internal diameter of the fluidic channel changes.

12. The method of claim 7, wherein the fluidic channel is disposed within a wellbore.

13. A wellbore system comprising:
 a fluidic channel disposed within a wellbore and operable to have a fluid flow therethrough, wherein the wellbore descends through an earth formation;
 a measurement device disposed within and movable throughout the fluidic channel, the measurement device comprising:
  a hydrodynamic central body,
  a plurality of arms coupled with the hydrodynamic central body, the plurality of arms operable to extend from and retract to the hydrodynamic central body, and
  a plurality of sensors disposed within the hydrodynamic central body and distributed along the length of each of the plurality of arms;
  one or more cleaning members coupled with the central body and operable to clean the plurality of arms; and
 a control facility communicatively coupled with the measurement device, the control facility operable to receive one or more dynamic fluid flow parameters from the measurement device.

14. The wellbore system of claim 13, further comprising a computing device communicatively coupled with the control facility, the computing device operable to control an actuator within the measurement device.

15. The wellbore system of claim 14, wherein the actuator is operable to control the plurality of arms.

16. The wellbore system of claim 13, wherein the plurality of dynamic fluid flow parameters includes a flow rate, a velocity, a fluid level, a fluid phase, a fluid ID, a density, and a pressure.

17. The wellbore system of claim 13, wherein the hydrodynamic central body further comprises a plurality of slots, each of the plurality of slots being sized to fit one of the plurality of arms therein.

\* \* \* \* \*